United States Patent
Nussey et al.

(10) Patent No.: US 8,838,709 B2
(45) Date of Patent: Sep. 16, 2014

(54) ANTI-PHISHING ELECTRONIC MESSAGE VERIFICATION

(75) Inventors: William Charles Nussey, Smyrna, GA (US); Desireé Turner Maurice, Chamblee, GA (US); Christopher Michael Curtin, Acworth, GA (US)

(73) Assignee: Silverpop Systems, Inc., Atlanta, GA (US)

( * ) Notice: Subject to any disclaimer, the term of this patent is extended or adjusted under 35 U.S.C. 154(b) by 206 days.

(21) Appl. No.: 13/220,167

(22) Filed: Aug. 29, 2011

(65) Prior Publication Data

US 2012/0158870 A1   Jun. 21, 2012

Related U.S. Application Data

(60) Provisional application No. 61/424,397, filed on Dec. 17, 2010.

(51) Int. Cl.
*H04L 12/58* (2006.01)

(52) U.S. Cl.
CPC .................................. *H04L 51/063* (2013.01)
USPC ............ 709/206; 709/207; 709/217; 455/466

(58) Field of Classification Search
CPC ................ H04N 21/43615; H04N 2201/3204; H04N 2201/3205; G06K 7/10297
USPC ............................. 709/206, 207, 217; 455/466
See application file for complete search history.

(56) References Cited

U.S. PATENT DOCUMENTS

| | | | |
|---|---|---|---|
| 7,647,376 B1 * | 1/2010 | Jagger et al. ................. | 709/206 |
| 8,185,942 B2 * | 5/2012 | Farrugia et al. .................... | 726/9 |
| 8,296,372 B2 * | 10/2012 | Flach ............................ | 709/206 |
| 8,442,423 B1 * | 5/2013 | Ryan et al. ..................... | 434/362 |
| 2002/0032868 A1 * | 3/2002 | Yamamoto et al. ............ | 713/193 |
| 2002/0169519 A1 * | 11/2002 | Ferrara et al. ................. | 700/224 |
| 2003/0112870 A1 * | 6/2003 | Fukuda et al. ............ | 375/240.12 |
| 2007/0100779 A1 * | 5/2007 | Levy et al. .................... | 705/500 |
| 2007/0271346 A1 * | 11/2007 | Vill .............................. | 709/206 |
| 2010/0060415 A1 * | 3/2010 | Goyet .......................... | 340/5.74 |
| 2010/0306845 A1 * | 12/2010 | Vaithilingam et al. .......... | 726/23 |
| 2011/0059727 A1 * | 3/2011 | Lisboa ........................ | 455/414.1 |
| 2011/0066479 A1 * | 3/2011 | Benson ........................ | 705/14.4 |
| 2011/0252146 A1 * | 10/2011 | Santamaria et al. .......... | 709/227 |
| 2011/0312278 A1 * | 12/2011 | Matsushita et al. .......... | 455/66.1 |

* cited by examiner

*Primary Examiner* — Tesfay Yohannes (74) *Attorney, Agent, or Firm* — Kilpatrick Townsend & Stockton LLP (57) ABSTRACT

Systems and methods are disclosed for allowing a recipient of an electronic message to verify the authenticity of the electronic message. A code can be included in the electronic message. The code can represent, or be associated with, an attribute of the electronic message. The recipient can navigate independently of the electronic message to a website familiar to the recipient and enter the code. In response, one or more attributes can be displayed to the recipient. The attributes are usable to verify the electronic message.

22 Claims, 10 Drawing Sheets

Fig. 1

MAILING

| Mailing_id | Mailing_name | List_id | Has_sure_from |
|---|---|---|---|
| 1000 | TEST | 500 | 1 |

MAILING SEND HISTORY

| Mailing_id | Report_id | Sent_ts | Num_sent |
|---|---|---|---|
| 1000 | 1001 | 01-JAN-11 | 3 |

DELIVERABILITY

| Mailing_id | Report_id | Job_id | Sent_ts | Recipient_id | email |
|---|---|---|---|---|---|
| 1000 | 1001 | 1002 | 01-JAN-11 | 501 | bob@test.com |
| 1000 | 1001 | 1002 | 01-JAN-11 | 502 | fred@test.com |
| 1000 | 1001 | 1002 | 01-JAN-11 | 503 | sam@test.com |

ANTI-PHISHING ELECTRONIC MESSAGE VERIFICATION

CROSS-REFERENCE TO RELATED APPLICATIONS

This application claims priority to U.S. Ser. No. 61/424, 397, titled "SureForm: Anti-Phishing Email Verification" and filed Dec. 17, 2010, the entirety of which is incorporated herein by reference.

FIELD

This disclosure relates generally to computer technology, including hardware and software, that is usable to allow an electronic message to be verified.

BACKGROUND

Electronic message phishing is a problem. "Phishing" includes unscrupulous individuals or entities attempting to acquire sensitive information, such as usernames, passwords, and credit card details, by masquerading as a trustworthy entity in an electronic communication. For example, electronic messages, such as email or instant messages, purporting to be from known entities are used to lure an unsuspecting recipient into providing sensitive information to what the recipient thinks is a website of a trustworthy organization, but instead is fake website controlled by a corrupt individual that is ready to exploit the sensitive information fraudulently. Phishing has cost individuals and organizations billions of dollars in fraudulent charges and lost business.

Websites, such as "ismycreditstolen.com," controlled by concerned individuals seek to educate the public on this problem. Government agencies are engaged in identifying phishing websites to eradicate using the criminal legal system. Software, such as spam filters and security applications, attempt to identify and/or block electronic messages having phishing-related content. Websites use verification images and icons to reduce phishing.

Although each of these tools is important and effective in their own way in reducing phishing, more tools are needed. For example, recipients using any or all of these do not have a method by which the recipients can verify that a received electronic message is legitimate. Accordingly, systems and methods are desirable that are usable to verify electronic messages received by recipients.

SUMMARY

One aspect is a storage device that includes modules executable by a processor to perform actions. The modules include a code module, a message module, and a verification module. The code module can generate a code for an electronic message. The electronic message includes an instruction for a recipient of the electronic message to navigate independently of the electronic message to a website of an organization to verify the electronic message. The message module can transmit the electronic message that includes the code to the recipient. The verification module can receive the code through a web page, identify an attribute of the electronic message using the code, and provide the attribute that is usable by the recipient to verify the electronic message.

Another aspect is a storage device that includes program code that is executable by a processor to perform actions. The program code can provide content and a verification token for an electronic message, and provide an identification of a recipient to which to transmit the electronic message. The program code can provide a web page that includes a verification form through which a code from the electronic message is receivable. The program code can provide the code to a computing device in response to receiving the code through the verification form. The program code can receive an attribute of the electronic message from the computing device. The program code can provide a second web page that has the attribute displayed on it. The attribute is usable by the recipient to verify the electronic message.

Another aspect is a method in which an electronic message is received that includes (i) content from an organization and (ii) a code. A web browser that is executing on a recipient device is accessed. The web browser is used to navigate to a website of the organization independently of the electronic message. The code is entered into a form displayed on a page of the website. An attribute displayed on the website is received. The attribute is about the electronic message and is usable to verify the electronic message.

These illustrative aspects are mentioned not to limit or define the disclosure, but to provide examples to aid understanding thereof. Additional aspects and embodiments are discussed in the Detailed Description, and further description is provided there. Advantages offered by one or more of the various aspects and embodiments may be further understood by examining this specification or by practicing one or more aspects and embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Certain features of the present disclosure include systems and methods for allowing a recipient of an electronic message to verify the authenticity of the electronic message. A code can be included in the electronic message. The code can represent, or be associated with, an attribute of the electronic message. In some embodiments, the electronic message also includes an instruction for the recipient to navigate independently of the electronic message to a website familiar to the recipient. Navigating independently of the electronic message can include a recipient accessing a website of an organization without selecting a Uniform Resource Locator (URL) or other similar link in the electronic message. For example, the recipient can open a web browser application, enter a URL known to the recipient and associated with the website of the organization. The website can provide a form or other environment through which the website can receive the code from the recipient.

The website can provide the code to a verification module that can identify the attribute of the electronic message using the code. In some embodiments, the code may be an encrypted code that the verification module decrypts. The attribute can be returned to the recipient by a web page or other suitable mechanism. The attribute is usable by the recipient to verify that the electronic message is legitimate, i.e. that the electronic message is validly associated with the organization and can be trusted by the recipient as an electronic message that does not include phishing mechanisms.

Any type of attribute with which the recipient can verify the electronic message can be used. Examples of attributes include the identity of the organization that sent the electronic message or otherwise was the source of the content included in the electronic message, the address or other contact information of the recipient, the date and/or time that the electronic message was sent to the recipient, the subject of the electronic message, and the content of the electronic message.

The code may be a randomly generated code that is associated by a stored relationship with one or more attributes of the electronic message. In other embodiments, the code is an encrypted or decrypted code that represents one or more attributes of the electronic message. For example, the code may represent a mailing identifier, a job identifier, and a recipient identifier. The mailing identifier can identify content of the electronic message. The job identifier can identify the batch of electronic mailings or the time and date of electronic mailings that included the electronic message. The recipient identifier can identify the recipient of the electronic message or contact information, such as email address, of the recipient.

Certain embodiments provide a simple, effective way for electronic message recipients to verify the authenticity of received messages. The code can be dynamically generated and included anywhere in an electronic message using personalization fields. Organizations, such as marketers, can educate recipients to look for the code and provide information on the process of using the code to verify the authenticity of a given electronic message. Website links or URLs, a common way phishing is implemented, to access a web page in which to verify the code can be avoided by instructing recipients to independently navigate to the website of the organization. The code may be uniquely generated and encrypted to prevent those that seek to "phish" from duplicating the code. The process can be structured to not impact electronic message delivery and can be accessed on demand by the recipient.

These illustrative examples are given to introduce the reader to the general subject matter discussed here and are not intended to limit the scope of any claim. The following sections describe various additional embodiments and examples with reference to the drawings in which like numerals indicate like elements.

Illustrative System and Data Relationship Implementation

Figure 1:
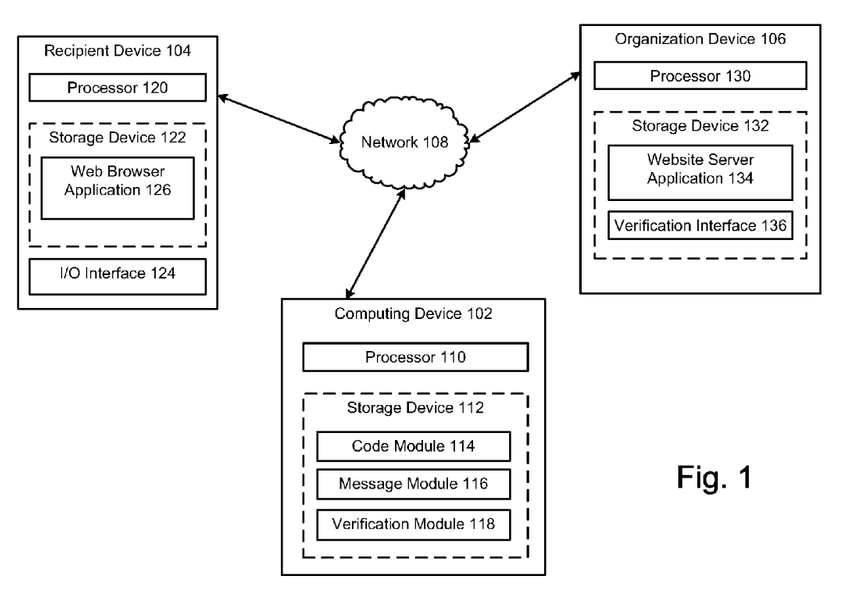
FIG. 1 is a block diagram of a system for verifying an electronic message according to one embodiment.
Figure 2:
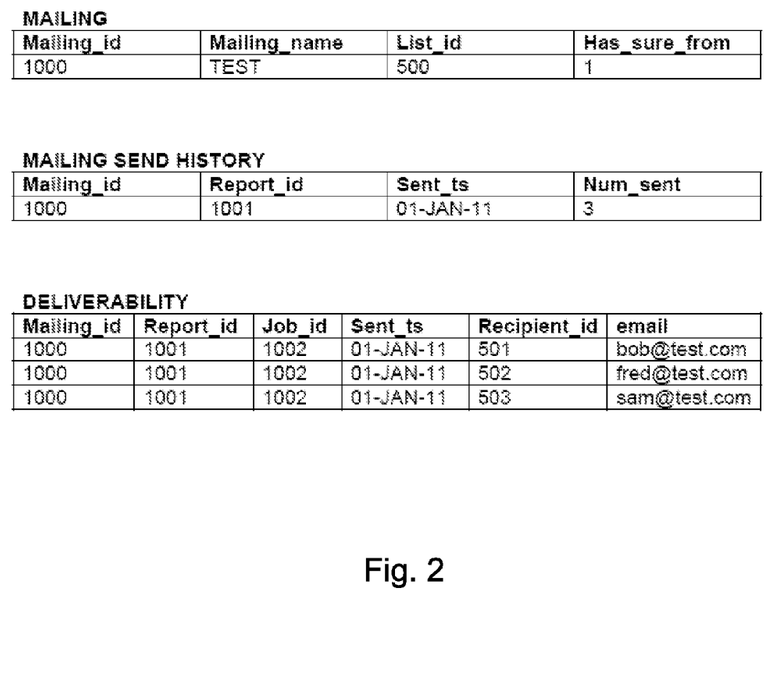
FIG. 2 depicts data relationships usable to associate codes with attributes of an electronic message according to one embodiment.

FIG. 1 depicts a system for allowing a recipient to verify an electronic message according to certain embodiments. FIG. 2 illustrates exemplary data relationships that can be included in the system. Other embodiments may be utilized.

The system includes a computing device 102, a recipient device 104, and an organization device 106 that communicate over a network 108. The network 108 can include the internet, an intranet, wide area network (WAN), local area network (LAN), virtual private network (VPN), or any suitable communications network that allows computing device 102, recipient device 104, and organization device 106 to communicate. Network 108 may include one or more networks.

The computing device 102 includes a processor 110 that can execute program code stored on a computer-readable medium, such as storage device 112, to cause the computing device 102 to perform actions as explained in more detail below. The computing device 102 may be any device that can process data and execute program code that is a set of instructions to perform actions. Examples of the computing device 102 include a web server, a database server, desktop personal computer, a laptop personal computer, a server device, a handheld computing device, and a mobile device.

Examples of the processor 110 include a microprocessor, an application-specific integrated circuit (ASIC), a state machine, or other suitable processor. The processor 110 may include one processor or any number of processors. The processor 110 can access code stored in the storage device 112 via a bus (not shown) or other mechanism. The storage device 112 may be any tangible computer-readable medium capable of embodying code and can include electronic, magnetic, or optical devices, capable of providing processor 110 with executable code. Examples of storage device 112 include random access memory (RAM), read-only memory (ROM), a floppy disk, compact disc, digital video device, magnetic disk, an ASIC, a configured processor, or other storage device.

Executable program code and data can be stored in the storage device 112. The program code can include processor-specific instructions generated by a compiler and/or an interpreter from code written in any suitable computer-programming language, such as C, C++, C#, Visual Basic, Java, Python, Perl, JavaScript, and ActionScript. The program code can include a code module 114, message module 116, and verification module 118. The code module 114 can be executed to cause the computing device to generate a code to include in an electronic message. The message module 116 can be executed to cause the computing device to transmit an electronic message with the code to a recipient. The verification module 118 can be executed to cause the computing device to identify an attribute for the electronic message and provide the attribute in response to receiving the code from the recipient device 104 or the organization device 106. Storage device 112 can also include a database that may store attributes of the electronic message.

The recipient device 104 may be used by a recipient of an electronic message. Examples of recipient device 104 include a desktop personal computer, a laptop personal computer, a handheld computing device, a mobile device, and a device in communication with a server device, database server, or a web server.

Recipient device 104 includes a processor 120, a storage device 122, and an input/output (I/O) interface 124. The processor 120 may be similar to processor 110 and storage device 122 may be similar to storage device 112, both of which are described in detail above. The recipient device 104 can send and receive data, commands, and other information with additional computers through the I/O interface 124. The I/O interface 124 can include a USB port, an Ethernet port, a serial bus interface, a parallel bus interface, a wireless connection interface, or any suitable interface capable of allowing data transfers between the computing device and one or more other components. Examples of components include a display, a mouse, a keyboard, a separate data storage device, a printer, a scanner, and a haptic device.

The storage device 122 can include program code, such as a web browser application 126, that is tangibly embodied on the storage device 122. The web browser application 126 can be executed by the processor 120 to allow the recipient to access web pages of websites to input the code and receive one or more attributes for an electronic message. The program code may also include a message management application (not shown), such as an email management application, to allow the recipient to receive an electronic message that includes the code.

The organization device 106 may be used by an organization, such as a marketer, that offers for sale or sales goods or services through the network 108. Examples of the organization device 106 include a web server, a database server, desktop personal computer, a laptop personal computer, a server device, a handheld computing device, and a mobile device.

The organization device 106 includes a processor 130 and storage device 132. The processor 130 may be similar to processor 110 and storage device 132 may be similar to storage device 112, both of which are described in detail above. The storage device 132 can include program code, such as website server application 134 and verification interface 136, tangibly embodied on a computer-readable medium. The website server application 134 is executable by the processor 130 to cause the organization device 106 to provide one or more web pages for a website to the network 108 and receive the code from the recipient through one or more web pages. The verification interface 136 is executable by the processor 130 to cause the organization device 106 to provide content for an electronic message to the computing device 102, provide the code from the recipient to the computing device 102, and receive one or more attributes for the electronic message from the computing device 102.

In some embodiments, the computing device 102 also includes the website server application 134 and the verification interface 136, and the organization device 106 is not needed or used. In other embodiments, the organization device 106 includes the code module 114, message module 116, and verification module 118, and the computing device 102 is not used or needed.

Data relationships can be used to allow one or more attributes of an electronic message to be identified using the code. FIG. 2 depicts examples of data relationships that can be stored in storage device 112 or in a separate storage device, such as a database, that is communicatively coupled to the computing device 102. The data relationships include three tables of data that can be associated with each other through a mailing identifier (shown in the tables as "Mailing_id"). The mailing identifier can be decrypted from a code or can be associated with a randomly generated code. The tables include a mailing table, a mailing send history table, and a deliverability table. The mailing table includes the mailing identifier (Mailing_id), a mailing name (Mailing_name), a list identifier (List_id), and a code indicator (Has_sure_from).

A mailing name may be a name associated with a particular mailing and is usable to identify the source of the content of messages in the mailing. The list identifier may be usable to identify content for the messages or to identify a list of recipients to which to send the content. The code indicator can indicate whether messages in the mailing included a code that is useable to verify the message. For example, a "1" in the code indicator field can indicate that a code was present in the messages, while a "0" in the code indicator field can indicate that a code was not present in the messages. The mailing name, the list identifier, and the code indicator can be associated with the mailing identifier in the mailing table.

The mailing send history table can include the mailing identifier (Mailing_id) and a report identifier (Report_id), a send date (Sent_ts), and a number of messages sent (Num_sent), all associated with the mailing identifier. The report identifier can be associated with reporting date for the mailing, which is usable to run audit reports and reports on whether one or more codes were used to verify messages, including the number of times codes were used successfully and/or unsuccessfully to verify messages. The send date identifies the date on which a mailing was transmitted.

In addition to the mailing identifier, the mailing send history table and the deliverability table can be associated with the report identifier. The deliverability table includes the mailing identifier (Mailing_id), the report identifier (Report_id), a job identifier (Job_id), the send date (Sent_ts), a recipient identifier (Recipient_id), and emails of the recipients. The job identifier can identify the job in which the messages were generated and transmitted. The recipient identifier may be a number that is associated with a particular recipient via an associated with the email address of the particular recipient.

This exemplary system configuration and data relationships are provided to illustrate configurations of certain embodiments. Other configurations and embodiments may of course be utilized.

Exemplary Methods of Allowing Verification of an Electronic Message

Figure 3:
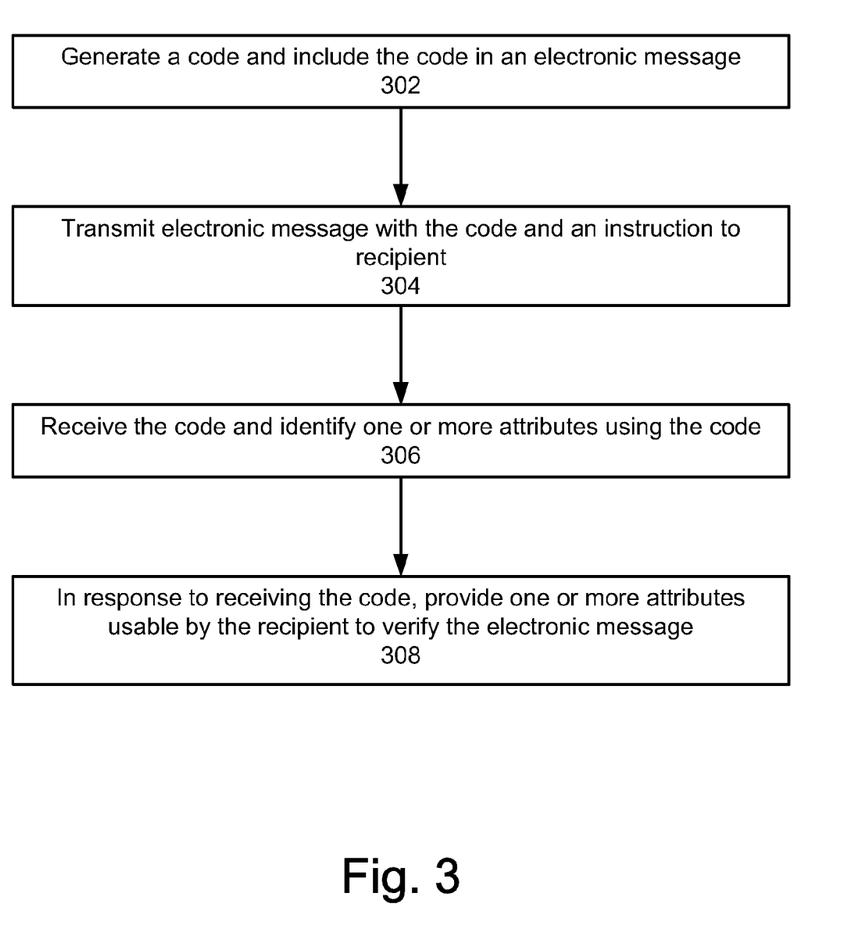
FIG. 3 is a flow chart of a method for generating a code for an electronic message and providing an attribute usable to verify the electronic message according to one embodiment.

FIG. 3 is a flow diagram of a process by which a computing device can allow a recipient to verify an electronic message according to certain embodiments. The process is described with reference to the system implementation shown in FIG. 1. Other implementations and processes, however, are possible.

In block 302, the code module 114 generates a code and includes the code in an electronic message. A different code can be generated for each recipient. In some embodiments, the computing device 102 can receive message content in a template or other suitable format that the computing device 102 can use to implement an electronic message distribution program by which electronic messages with similar content (e.g. an advertisement or an offer) are personalized by recipient and transmitted. The template can include tokens, fields, or other indicators at which the computing device 102 includes personalized information for the recipient. The template can include a token indicating that a code for the recipient is to be included in the electronic message. In response, the code module 114 can generate the code and include in the electronic message at the location specified by the token.

The code can be generated based on a job identifier, mailing identifier, and/or recipient identifier that is associated with the message. In other embodiments, the code is randomly generated and is associated with attributes for the message. The relationship between the attributes of the message and the code can be stored. In either case, the code can be encrypted by the code module 114. The code can be encrypted using any suitable encryption process. An example of a suitable encryption process is a process conforming to the Advanced Encryption Standard (AES).

In block 304, the message module 116 transmits the electronic message with the code and an instruction to the recipient. The electronic message may be transmitted as an email, an instant message, a social media message, or via other type of electronic communication method. The instruction may be for the recipient to navigate independently of the electronic message to a website associated with the organization that provided the content in the electronic message and use the code included in the electronic message to verify the electronic message. Although the electronic message may include a URL or link to part of the website of the organization, the instruction can encourage the recipient to verify the electronic message without using the URL or link included in the electronic message.

In block 306, the verification module 118 receives the code and identifies one or more attributes of the electronic message using the code. In some embodiments, the verification module 118 receives the code from the verification interface 136 of the organization device 106 after the recipient navigates to the website for the organization and provides the code to the website. In other embodiments, the verification module 118 receives the code from the recipient through a web page hosted by the computing device 102. The verification module 118 can identify an attribute of the electronic message by comparing the code to a stored relationship between the code and the attribute(s) or by decrypting the code to identify the job identifier, mailing identifier, and/or recipient identifier and determine the attribute(s) based on those identifiers.

In block 308, the verification module 118 can respond to receiving the code by providing the attribute(s) that is usable by the recipient to verify the electronic message. The attribute(s) can be provided as HTML code for display in a web page, as XML code for including in a web page as data, or other suitable method. Examples of attributes include the identity of the organization that sent the electronic message or otherwise was the source of the content included in the electronic message, the address or other contact information of the recipient, the date and/or time that the electronic message was sent to the recipient, the subject of the electronic message, and the content of the electronic message. The website server application 134 of the organization device 106 can display the attribute(s) to the recipient in a web page or the computing device 102 can provide a web page with the attribute(s) displayed thereon to the recipient.

Figure 4:
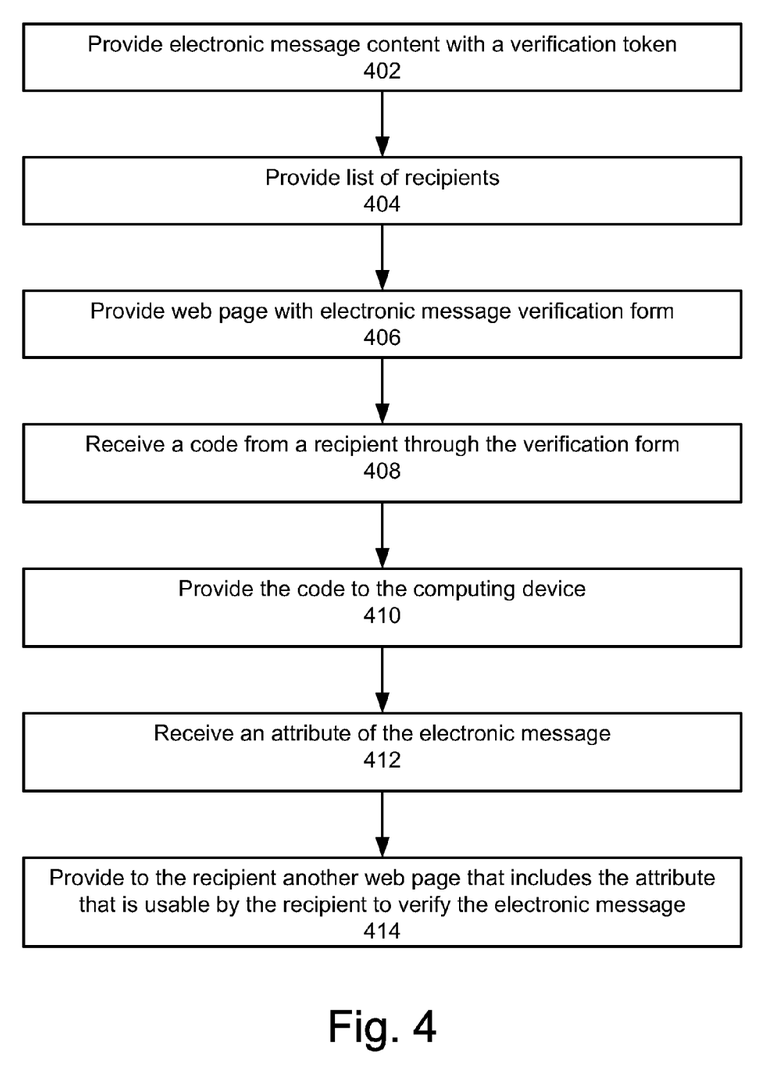
FIG. 4 is a flow chart of a method for providing to a recipient an attribute usable to verify an electronic message according to one embodiment.

FIG. 4 is a flow diagram of a process by which an organization device can allow a recipient to verify an electronic message according to certain embodiments of the present invention. The process is described with reference to the system implementation shown in FIG. 1. Other implementations and processes, however, are possible.

In block 402, the verification interface 136 provides electronic message content with a verification token to the computing device 102. For example, the verification interface 136 can provide a template with an advertisement or offer to be provided to recipients as part of a marketing strategy. The verification token can be a field or other indicator in the template that instructs an application executing the marketing strategy to include a code to allow a recipient to verify an electronic message. The electronic message content can also include an instruction for the recipient to navigate to a website for the organization independently to the electronic message to verify the electronic message.

In block 404, the verification interface 136 provides a list that identifies recipients to the computing device 102. The list of recipients can include electronic addresses for recipients that are to receive electronic messages with the content.

In block 406, the website server application 134 provides a web page with an electronic message verification form to the recipient. For example, the website server application 134 can provide a homepage with a link that, when selected by the recipient, causes a web page with the electronic verification form to be provided to the recipient. The electronic message verification form can be any format through which information can be received from the recipient.

In block 408, the verification interface 136 receives a code from the recipient through the verification form. The code may be the code in an electronic message that the recipient received.

In block 410, the verification interface 136 provides the code to the computing device 102. In some embodiments, the verification interface 136 makes an application programming interface (API) call to the computing device 102 to communicate the code to the computing device 102.

In block 412, the verification interface 136 receives at least one attribute for the electronic message from the computing device 102 in response to providing the code. The attribute may be any information that the recipient can use to verify the electronic message.

In block 414, the verification interface 136 provides to the recipient another web page that includes the attribute that is usable by the recipient to verify the electronic message. The attribute can be provided, for example, in a list of information. The verification interface 136 can also provide a confirmation that the code is a valid code.

Figure 5:
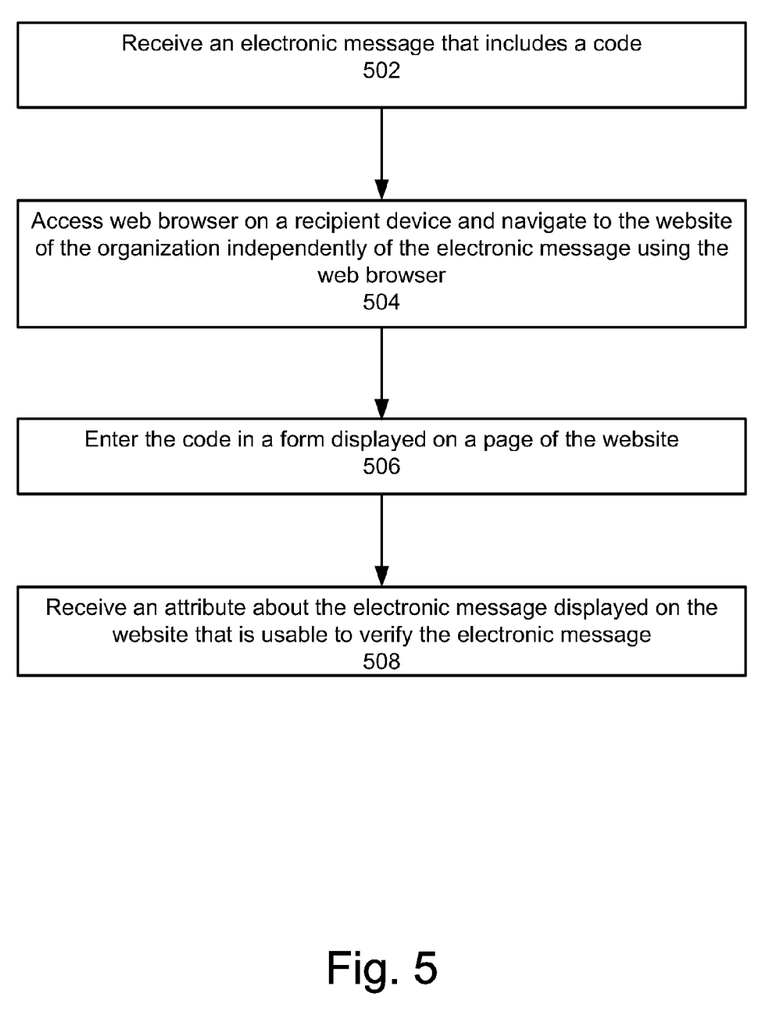
FIG. 5 is a flow chart of a method for receiving an attribute of an electronic message that is usable to verify the electronic message according to one embodiment.

FIG. 5 is a flow diagram of a process by which a recipient can verify an electronic message according to certain embodiments of the present invention. The process is described with reference to the system implementation shown in FIG. 1. Other implementations and processes, however, are possible In block 502, the recipient, using the recipient device 104, receives an electronic message that includes a code. For example, the recipient can access the electronic message using an email application stored on the recipient device 104 or from a server of a web-based email application using the web browser application 126.

In block 504, the recipient accesses the web browser application 126 on the recipient device 104 and navigates, independently of the electronic message, to the website of the organization that was the source of the content using the web browser application 126. For example, the recipient can open the web browser application 126 and enter the URL of the organization homepage or search, using a web-based search engine, for the organization by entering the name of the organization and selecting a corresponding link to the organization homepage from the search results.

In block 506, the recipient enters the code from the electronic message in a form displayed on a web page of the organization website. In some embodiments, the homepage of the organization website includes a selectable link that directs the recipient to a web page of the organization website that includes the form. The recipient can type the code into the form or copy and paste the code into the form, and then select an option to submit the code.

In block 508, the recipient receives an attribute of the electronic message. The attribute can be displayed on the website and is usable by the recipient to verify the electronic message.

Exemplary User Interfaces

Figure 6:
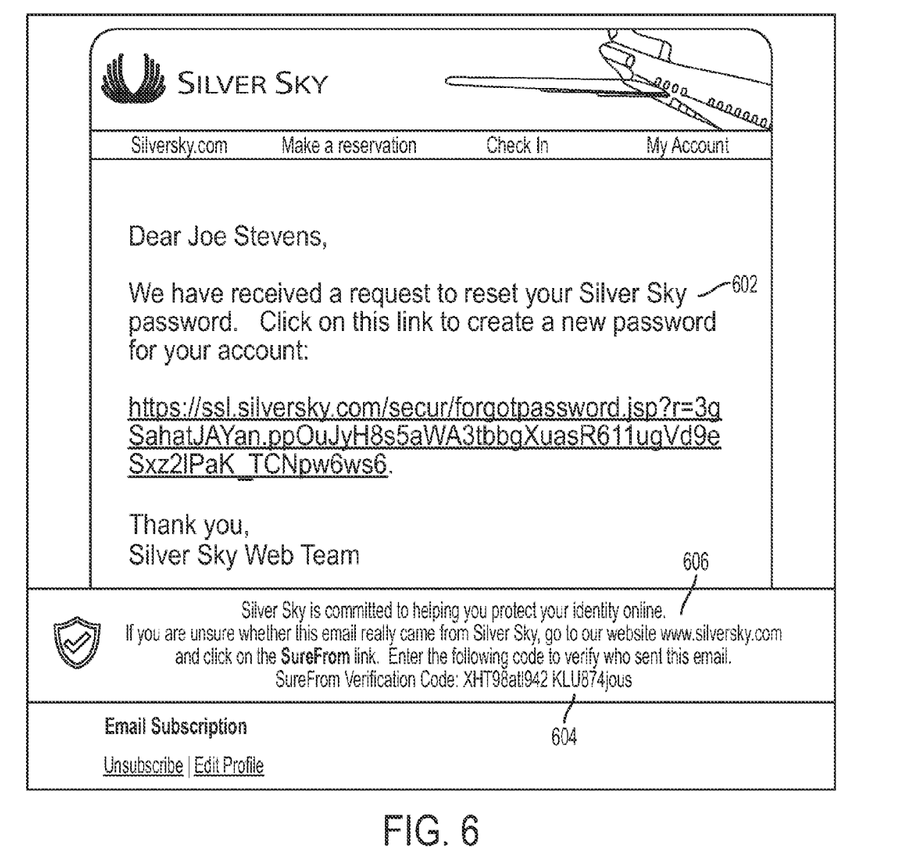
FIG. 6 is an electronic message with a code and instructions according to one embodiment.

FIGS. 6-10 depict user interfaces according to some embodiments that may be provided to a recipient as a web page, email, instant message, or other suitable mechanism. FIG. 6 depicts a user interface of an electronic message that includes content 602, a code 604, and an instruction 606. The electronic message may be displayed in an email application, on a web page, or a mobile device display. The content is from an organization referred to as "SilverSky." The code 604 is an encrypted, alphanumeric code that represents a job identifier, a mailing identifier, and a recipient identifier for the electronic message. The instruction 606 instructs the recipient to, if unsure about whether the electronic message is legitimate, to navigate to the website of the organization and select a link by which the code can be used to verify the electronic message. Although the content includes a link, the instruction 606 instructs the recipient to navigate independently of the electronic message to the website of the organization, which is familiar to the recipient, to use the code to allow the recipient to verify the electronic message.

Figure 7:
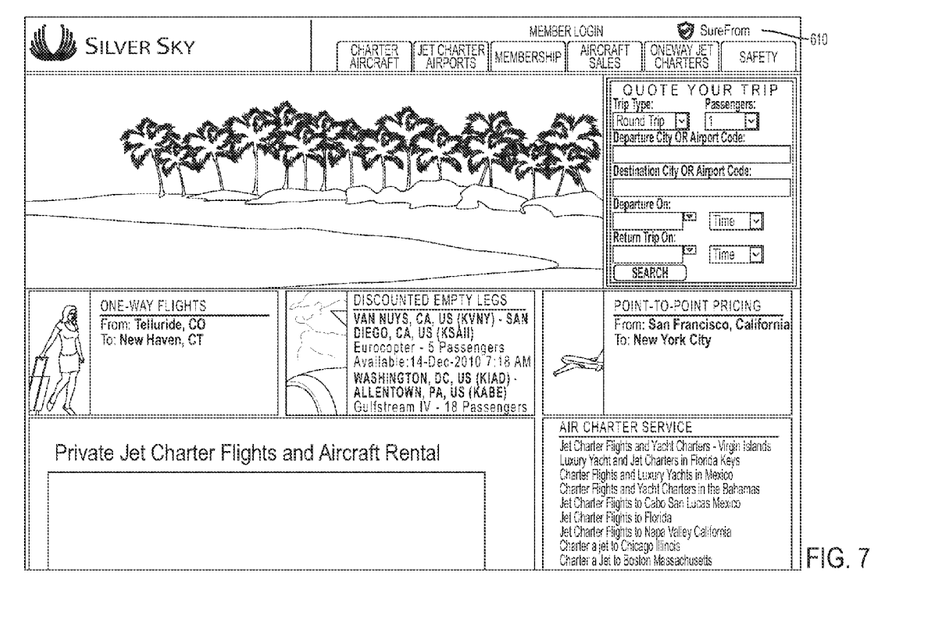
FIG. 7 is a user interface of a website of an organization with a verification link displayed thereon according to one embodiment.
Figure 8:
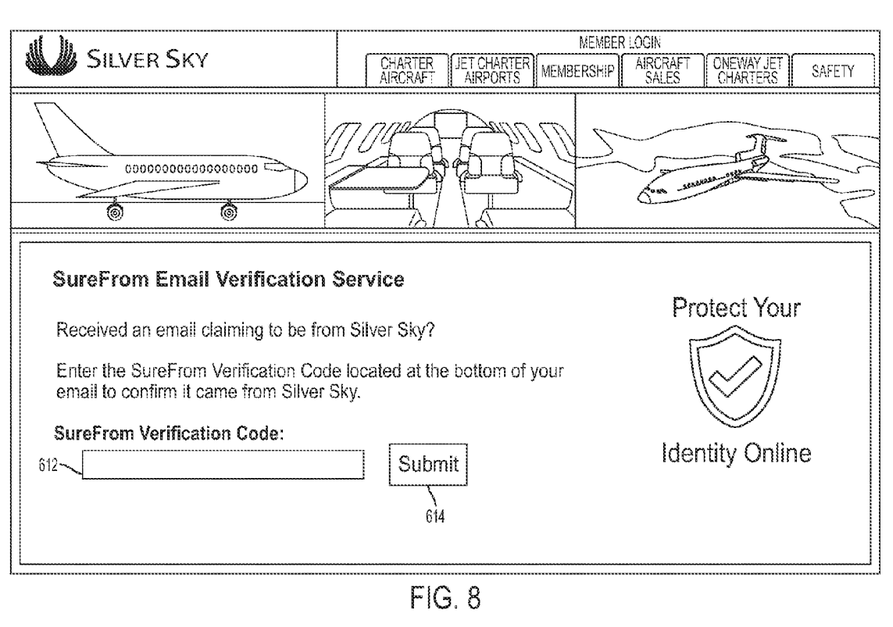
FIG. 8 is a user interface of a website of an organization with a form for receiving a code from a recipient according to one embodiment.

After navigating to the website of the organization—using a web browser application or otherwise—a homepage of the organization can be provided to the recipient. An example of a homepage is shown in FIG. 7. The homepage includes an icon 610 labeled "SureForm." The icon 610 can be associated with a link that, when selected by the recipient, causes a web page to be provided to the recipient. An example of a web page is shown in FIG. 8. The web page includes a form 612 in which the recipient can enter the code and a link 614, labeled "submit" that the recipient can select to submit the code to the website. An application hosted by the organization or a third party can determine if the code is associated with an electronic message. If so, the application can identify one or more attributes for the electronic message based on the code.

Figure 9:
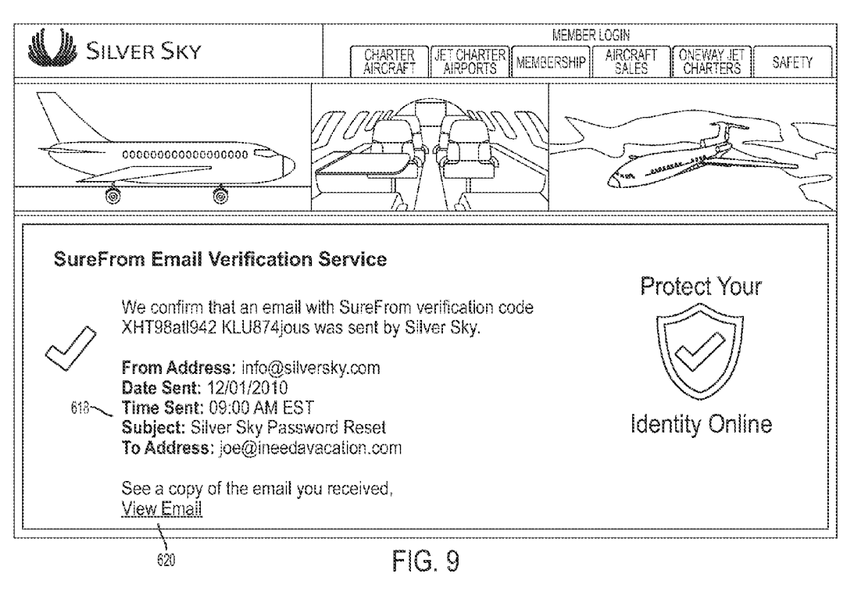
FIG. 9 is a user interface of a website of an organization with attributes usable to verify an electronic message associated with the attributes according to one embodiment.

FIG. 9 depicts an example of a user interface that is provided to the recipient in response to the recipient providing a code that is associated with an electronic message. The user interface includes attributes 618 of the electronic message that the recipient can use to verify the electronic message. The attributes include the email address of the source of the content included in the electronic message, the date on which the electronic message was sent, the time at which the electronic message was sent, the subject of the electronic message, and an email address for the intended recipient of the electronic message. The attributes can be returned and displayed in one field or in more than one field. The user interface also includes a link 620, labeled "View Email," that the recipient can select to view the content of the electronic message. The recipient can compare the attributes to the electronic message received to verify that the electronic message was sent by or on behalf of a trusted source—the organization.

Figure 10:
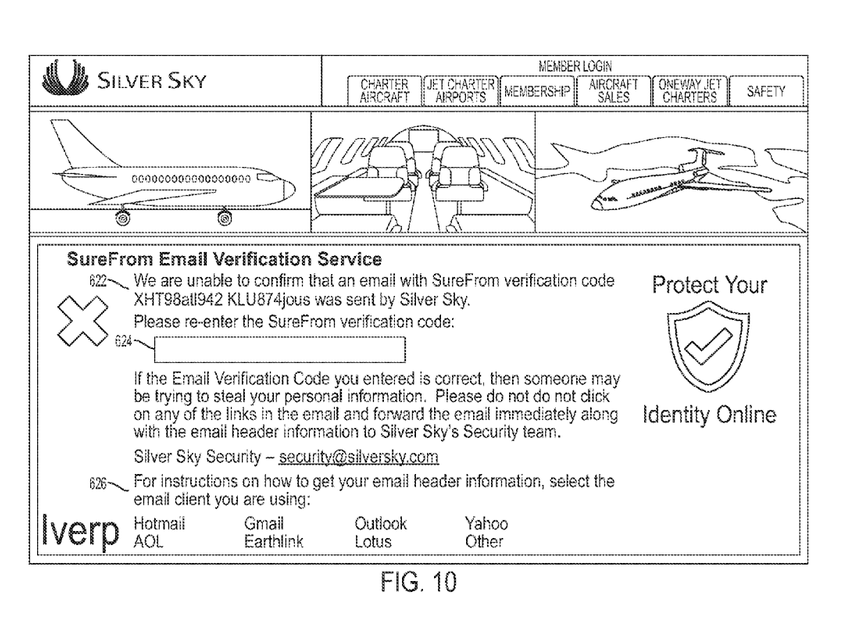
FIG. 10 is a user interface of a website of an organization indicating that a code from a recipient is not confirmed according to one embodiment.

If the code is not associated with an electronic message, a user interface, such as the user interface in FIG. 10, can be displayed to the recipient. The user interface in FIG. 10 includes a message 622 indicating that the system was unable to confirm the code, a form 624 in which the recipient can re-enter the code in case (for example, the code was initially mistyped or was otherwise incorrect), and information 626 on how the recipient can investigate the source of the electronic message further.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A storage device comprising modules executable by a processor to perform actions, the modules comprising:
   a code module for generating a code for an electronic message based on an attribute of the electronic message, the electronic message comprising an instruction for a recipient of the electronic message to navigate independently of the electronic message to a website of an organization to verify authenticity of the electronic message;
   a message module for transmitting the electronic message comprising the code to the recipient; and
   a verification module usable to verify the authenticity of the electronic message, the verification module configured for receiving the code through a web page, determining the attribute of the electronic message based at least in part on the code, and providing the attribute that is usable by the recipient to verify the authenticity of the electronic message.

2. The storage device of claim 1, wherein the attribute comprises:
   a subject of the electronic message;
   a transmission time of the electronic message;
   an identification of the organization for which the electronic message is transmitted; and
   an identification of an address to which the electronic message is transmitted.

3. The storage device of claim 2, wherein the attribute further comprises content of the electronic message.

4. The storage device of claim 1, wherein the code module is configured to encrypt the code for the electronic message and decrypt the code received through the web page.

5. The storage device of claim 1, wherein the verification module is configured to:
   receive the code through the web page by receiving the code from the organization through the web page that is provided by the organization; and provide the attribute that is usable by the recipient to verify the electronic message by providing the attribute to the organization, wherein the attribute is displayable to the recipient through a second web page provided by the organization.

6. The storage device of claim 1, wherein the code module is configured to generate the code for the electronic message in response to detecting a token for the code in a template of content for the electronic message.

7. The storage device of claim 1, wherein the code is an encrypted alphanumerical code representing a job identifier, a mailing identifier, and a recipient identifier for the electronic message.

8. The storage device of claim 7, wherein the verification module is configured to determine the attribute of the electronic message using the code by decrypted the code to identify the job identifier, the mailing identifier, and the recipient identifier, and determining the attribute based on at least one of the job identifier, the mailing identifier, or the recipient identifier.

9. The storage device of claim 1, wherein the verification module is configured to determine the attribute of the electronic message using the code by comparing the code to a stored relationship between the code and the attributed.

10. A storage device comprising program code that is executable by a processor to perform actions, the program code comprising:
   program code for providing content and a verification token for verifying authenticity an electronic message, and for providing an identification of a recipient to which to transmit the electronic message;
   program code for providing a web page comprising a verification form through which a code from the electronic message is receivable;
   program code for, in response to receiving the code through the verification form, providing the code to a computing device;
   program code for receiving, from the computing device, an attribute of the electronic message determined based at least in part on the code received via the web page; and
   program code for providing a second web page having the attribute of the electronic message displayed thereon, the attribute of the electronic message being usable by the recipient to verify the authenticity of the electronic message.

11. The storage device of claim 10, wherein the attribute comprises:
   a subject of the electronic message;
   a transmission time of the electronic message;
   an identification of an organization for which the electronic message is transmitted; and
   an identification of an address to which the electronic message is transmitted.

12. The storage device of claim 11, wherein the attribute further comprises content of the electronic message.

13. The storage device of claim 10, wherein the storage device is disposed in an organization device.

14. The storage device of claim 10, wherein the storage device is disposed in the computing device.

15. The storage device of claim 10, wherein the verification token is configured to instruct an application to include the code at a position of the verification token in the electronic message.

16. The storage device of claim 10, wherein program code for providing content and the verification token for the electronic message comprises program code for providing an instruction for the recipient to navigate independently of the electronic message to a website of an organization that is a source of the content.

17. The storage device of claim 10, program code for providing the code to the computing device comprises program code for making an application programming interface call to the computing device.

18. The storage device of claim 10, wherein the code is an encrypted alphanumerical code representing a job identifier, a mailing identifier, and a recipient identifier for the electronic message.

19. A method comprising:
   receiving an electronic message comprising (i) content from an organization and (ii) a code associated with an attribute of the electronic message;
   accessing a web browser that is executing on a recipient device;
   navigating to a website of the organization independently of the electronic message using the web browser;
   entering the code into a form displayed on a page of the website to verify authenticity of the electronic message; and
   receiving an attribute displayed on the website, the attribute being determined based at least in part on the code and usable to verify the authenticity of the electronic message.

20. The method of claim 19, wherein the attribute comprises:
   a subject of the electronic message;
   a transmission time of the electronic message;
   an identification of the organization for which the electronic message is transmitted; and
   an identification of an address to which the electronic message is transmitted.

21. The method of claim 20, wherein the attribute further comprises content of the electronic message.

22. The method of claim 19, wherein the code is an encrypted alphanumerical code representing a job identifier, a mailing identifier, and a recipient identifier for the electronic message.

* * * * *